United States Patent
Honey et al.

(10) Patent No.: US 10,194,590 B2
(45) Date of Patent: Feb. 5, 2019

(54) HARVESTING HEADER BAT WITH ADJUSTABLY SPACED QUICK RELEASE FINGERS

(71) Applicant: HONEY BEE MANUFACTURING LTD., Frontier (CA)

(72) Inventors: Glenn Honey, Frontier (CA); Nelson Cherry, Frontier (CA)

(73) Assignee: HONEY BEE MANUFACTURING LTD., Frontier, SK (CA)

( * ) Notice: Subject to any disclaimer, the term of this patent is extended or adjusted under 35 U.S.C. 154(b) by 114 days.

(21) Appl. No.: 15/197,345

(22) Filed: Jun. 29, 2016

(65) Prior Publication Data

US 2016/0302358 A1  Oct. 20, 2016

Related U.S. Application Data

(63) Continuation of application No. 14/486,863, filed on Sep. 15, 2014, which is a continuation of application
(Continued)

(30) Foreign Application Priority Data

Jan. 28, 2013  (CA) ..................................... 2803715

(51) Int. Cl.
  *A01D 57/00*  (2006.01)
  *A01D 57/02*  (2006.01)
  (Continued)

(52) U.S. Cl.
  CPC ............. *A01D 57/02* (2013.01); *A01D 57/12* (2013.01); *A01D 80/02* (2013.01)

(58) Field of Classification Search
  CPC ........ A01D 57/02; A01D 57/12; A01D 80/00; A01D 80/02; Y10T 403/7005; Y10T 403/7015; F16B 21/02
  (Continued)

(56) References Cited

U.S. PATENT DOCUMENTS

| 12,750 A | 4/1855 | Chatfield |
| 524,215 A | 8/1894 | Quigley |

(Continued)

FOREIGN PATENT DOCUMENTS

| CA | 1003310 | 1/1977 |
| CA | 1040438 | 10/1978 |

(Continued)

*Primary Examiner* — Thomas B Will
*Assistant Examiner* — Mai T Nguyen

(57) ABSTRACT

A harvesting header bat having a channel for removably receiving alternating quick-release fingers and spacers is provided. The spacers are capable of production in different lengths to support different applications of the harvesting header. The quick-release finger is provided with projections configured for mating with flanges at the channel opening, enabling the finger to be inserted into the channel in a first orientation and then rotated into a second orientation to engage the flanges and releasably lock the finger in place. The spacers are also configured to engage the flanges of the channel and may be provided in different lengths where a particular harvesting header application requires a certain distance between fingers on the bat.

27 Claims, 3 Drawing Sheets

Related U.S. Application Data

No. 13/766,883, filed on Feb. 14, 2013, now Pat. No. 8,833,048.

(51) Int. Cl.
*A01D 80/02* (2006.01)
*A01D 57/12* (2006.01)

(58) Field of Classification Search
USPC ............ 56/220, 14.4, 400.16, 400.2, 400.21, 56/DIG. 9; 403/348, 353
See application file for complete search history.

(56) References Cited

U.S. PATENT DOCUMENTS

| | | | |
|---|---|---|---|
| 1,370,352 | A | 3/1921 | Parmley |
| 1,780,748 | A * | 11/1930 | Fisher .................. A01D 7/02 56/400 |
| 2,014,123 | A * | 9/1935 | Bailie .................. A01D 7/08 56/400.11 |
| 2,036,807 | A * | 4/1936 | Honn .................. A01D 7/08 56/400.01 |
| 2,413,072 | A | 12/1946 | Sage |
| 2,652,678 | A * | 9/1953 | Ramacher ............ A01D 51/002 56/220 |
| 2,673,440 | A * | 3/1954 | Sawyer .................. A01D 46/12 15/183 |
| 2,694,894 | A | 11/1954 | Linscheld |
| 3,108,426 | A * | 10/1963 | Rugg .................. A01D 7/02 294/49 |
| 3,126,693 | A * | 3/1964 | Renn .................. A01D 89/002 15/207.2 |
| 3,157,019 | A * | 11/1964 | Brackbill ............ A01D 80/02 172/705 |
| 3,468,109 | A | 9/1969 | Reimer |
| 3,472,008 | A | 10/1969 | Hurlburt |
| 3,550,366 | A | 12/1970 | Gibson |
| 3,616,631 | A * | 11/1971 | Quam .................. A01D 7/06 56/400 |
| 3,771,299 | A | 11/1973 | Gradwohl et al. |
| 3,927,512 | A | 12/1975 | Molzahn |
| 3,935,697 | A | 2/1976 | Hofer |
| 3,945,180 | A | 3/1976 | Sinclair |
| 4,038,810 | A | 8/1977 | Williams et al. |
| 4,067,177 | A | 1/1978 | Tout |
| 4,120,137 | A | 10/1978 | Schoenberger et al. |
| 4,127,981 | A | 12/1978 | Parrish et al. |
| 4,137,696 | A | 2/1979 | Webb |
| 4,156,340 | A | 5/1979 | Colgan et al. |
| 4,174,602 | A | 11/1979 | Webb et al. |
| 4,177,625 | A | 12/1979 | Knight et al. |
| 4,187,664 | A | 2/1980 | Meek et al. |
| 4,189,907 | A | 2/1980 | Erdman |
| 4,202,154 | A | 5/1980 | Waldrop et al. |
| 4,270,338 | A | 6/1981 | Halls |
| 4,346,909 | A | 8/1982 | Hundeby |
| 4,353,201 | A | 10/1982 | Pierce et al. |
| 4,435,948 | A | 3/1984 | Jennings |
| 4,512,140 | A | 4/1985 | Blakeslee |
| 4,519,190 | A | 5/1985 | Blakeslee |
| 4,522,018 | A | 6/1985 | Blakeslee |
| 4,541,229 | A | 9/1985 | Elijah |
| 4,573,124 | A | 2/1986 | Seiferling |
| 4,573,309 | A | 3/1986 | Patterson |
| 4,612,757 | A | 9/1986 | Halls et al. |
| 4,637,201 | A | 1/1987 | Pruitt et al. |
| 4,641,490 | A | 2/1987 | Wynn et al. |
| 4,660,361 | A | 4/1987 | Remillard et al. |
| 4,662,161 | A | 5/1987 | Patterson |
| 4,751,809 | A | 6/1988 | Fox et al. |
| 4,776,155 | A | 10/1988 | Fox et al. |
| 4,833,869 | A | 5/1989 | Klein |
| 4,901,511 | A | 2/1990 | Yarmashev et al. |
| 4,909,026 | A | 3/1990 | Molzahn et al. |
| 4,936,082 | A | 6/1990 | Majkrzak |
| 4,944,141 | A | 7/1990 | Orlando et al. |
| 4,956,966 | A | 9/1990 | Patterson |
| 5,005,343 | A | 4/1991 | Patterson |
| 5,007,235 | A | 4/1991 | Nickel et al. |
| 5,036,653 | A * | 8/1991 | Klinner .................. A01D 41/06 460/121 |
| 5,086,613 | A | 2/1992 | Fox et al. |
| 5,155,983 | A | 10/1992 | Sheehan et al. |
| 5,157,905 | A | 10/1992 | Talbot et al. |
| 5,243,810 | A | 9/1993 | Fox et al. |
| 5,261,290 | A | 11/1993 | Ramsay et al. |
| 5,313,771 | A * | 5/1994 | France .................. A01D 46/12 56/126 |
| 5,359,839 | A | 11/1994 | Parsons et al. |
| 5,435,239 | A | 7/1995 | Talbot |
| 5,459,986 | A | 10/1995 | Talbot et al. |
| 5,473,872 | A | 12/1995 | Fox et al. |
| 5,535,577 | A | 7/1996 | Chmielewski et al. |
| 5,577,286 | A * | 11/1996 | Smith .................... E01H 1/042 15/179 |
| 5,595,053 | A | 1/1997 | Jasper et al. |
| RE35,543 | E | 7/1997 | Patterson |
| 5,678,398 | A | 10/1997 | Fox et al. |
| 5,681,117 | A | 10/1997 | Wellman et al. |
| 5,704,200 | A | 1/1998 | Chmielewski, Jr. et al. |
| 5,768,870 | A | 6/1998 | Talbot et al. |
| 5,791,128 | A | 8/1998 | Rogalsky |
| 5,927,606 | A | 7/1999 | Patterson |
| 5,992,759 | A | 11/1999 | Patterson |
| 6,029,429 | A | 2/2000 | Fox et al. |
| 6,044,636 | A | 4/2000 | Minnaert |
| 6,079,194 | A | 6/2000 | Waldrop |
| 6,170,244 | B1 | 1/2001 | Coers et al. |
| 6,195,972 | B1 | 3/2001 | Talbot et al. |
| 6,199,357 | B1 | 3/2001 | Bloom |
| 6,199,358 | B1 | 3/2001 | Majkrzak |
| 6,282,876 | B1 | 9/2001 | Patterson |
| 6,324,823 | B1 | 12/2001 | Remillard |
| 6,351,931 | B1 | 3/2002 | Shearer |
| 6,397,573 | B2 | 6/2002 | Majkrzak |
| 6,442,918 | B1 | 9/2002 | Fox |
| 6,453,655 | B2 | 9/2002 | Ferraris |
| 6,502,379 | B1 | 1/2003 | Snider |
| 6,519,923 | B1 | 2/2003 | Cooksey et al. |
| 6,530,202 | B1 | 3/2003 | Guyer |
| 6,543,211 | B1 | 4/2003 | Talbot |
| 6,591,598 | B2 | 7/2003 | Remillard et al. |
| 6,675,568 | B2 | 1/2004 | Patterson et al. |
| 6,698,175 | B1 | 3/2004 | Schumacher et al. |
| 6,708,475 | B2 | 3/2004 | Guyer |
| 6,817,166 | B2 | 11/2004 | Dunn |
| 6,843,045 | B2 | 1/2005 | Bickel |
| 6,854,251 | B2 | 2/2005 | Snider |
| 6,865,871 | B2 | 3/2005 | Patterson et al. |
| 6,889,492 | B1 | 5/2005 | Polk et al. |
| 6,962,040 | B2 | 11/2005 | Talbot |
| 7,077,220 | B2 | 7/2006 | Dunn et al. |
| 7,124,564 | B2 | 10/2006 | Glazik et al. |
| 7,131,253 | B2 | 11/2006 | Remillard et al. |
| 7,159,687 | B2 | 1/2007 | Dunn et al. |
| 7,188,461 | B2 | 3/2007 | Fox et al. |
| 7,197,865 | B1 | 4/2007 | Enns et al. |
| 7,306,062 | B2 | 12/2007 | Dunn |
| 7,306,252 | B2 | 12/2007 | Barnett |
| 7,308,947 | B2 | 12/2007 | Barnett |
| 7,322,175 | B2 | 1/2008 | Ferre et al. |
| 7,328,565 | B2 | 2/2008 | Snider et al. |
| 7,340,876 | B1 | 3/2008 | Barnett |
| 7,347,277 | B2 | 3/2008 | Enns et al. |
| 7,356,982 | B2 | 4/2008 | Barnett |
| 7,364,181 | B2 | 4/2008 | Patterson |
| 7,373,769 | B2 | 5/2008 | Talbot et al. |
| 7,392,124 | B2 | 6/2008 | MacGregor et al. |
| 7,392,646 | B2 | 7/2008 | Patterson |
| 7,438,305 | B2 | 10/2008 | Schulz |
| 7,444,798 | B2 | 11/2008 | Patterson et al. |
| 7,454,888 | B2 | 11/2008 | Barnett |
| 7,461,498 | B1 | 12/2008 | Barnett |

(56) References Cited

U.S. PATENT DOCUMENTS

| | | | |
|---|---|---|---|
| 7,467,505 B2 | 12/2008 | MacGregor | |
| 7,472,533 B2 | 1/2009 | Talbot et al. | |
| 7,484,349 B2 | 2/2009 | Talbot et al. | |
| 7,497,069 B2 | 3/2009 | Enns et al. | |
| 7,647,755 B2 | 1/2010 | Barnett et al. | |
| 7,721,830 B2 | 5/2010 | Dunn et al. | |
| 7,730,707 B2 | 6/2010 | Pietricola et al. | |
| 7,849,952 B2 | 12/2010 | MacGregor et al. | |
| 7,856,801 B2 | 12/2010 | Remillard | |
| 7,918,076 B2 | 4/2011 | Talbot | |
| 7,958,706 B2 | 6/2011 | Remillard et al. | |
| 8,006,469 B2 | 8/2011 | Barnett | |
| 8,015,784 B2 | 9/2011 | Barnett et al. | |
| 8,020,363 B1 | 9/2011 | Barnett et al. | |
| 8,020,648 B2 | 9/2011 | Otto | |
| 8,056,311 B1 | 11/2011 | Barnett | |
| 8,069,640 B2 | 12/2011 | Barnett et al. | |
| 8,096,102 B2 | 1/2012 | Smith | |
| 8,117,812 B2 | 2/2012 | Patterson | |
| 8,161,719 B2 | 4/2012 | Barnett et al. | |
| 8,176,716 B2 | 5/2012 | Coers et al. | |
| 8,225,589 B2 | 7/2012 | Barnett | |
| 8,225,903 B2 | 7/2012 | Dunn | |
| 8,240,114 B2 | 8/2012 | Barnett | |
| 8,245,489 B2 | 8/2012 | Talbot | |
| 8,286,411 B2 | 10/2012 | Barnett et al. | |
| 8,286,412 B2 | 10/2012 | Kidd et al. | |
| 8,291,684 B2 | 10/2012 | Remillard et al. | |
| 8,291,686 B1 | 10/2012 | Cormier et al. | |
| 8,307,620 B1 | 11/2012 | Barnett et al. | |
| 8,333,057 B2 | 12/2012 | Schroeder et al. | |
| 8,341,927 B2 | 1/2013 | Barnett | |
| 8,387,351 B2 | 3/2013 | Guyer | |
| 8,402,728 B2 | 3/2013 | Kidd | |
| 8,408,567 B2 | 4/2013 | Bergman et al. | |
| 8,434,290 B2 | 5/2013 | Barnett et al. | |
| 8,468,789 B2 | 6/2013 | Barnett et al. | |
| 8,484,938 B2 | 7/2013 | Cormier et al. | |
| 8,484,939 B1 | 7/2013 | Cormier et al. | |
| 8,511,050 B1 | 8/2013 | Cormier et al. | |
| 8,590,284 B2 | 11/2013 | Rayfield | |
| 8,790,228 B2 * | 7/2014 | Wirth | A01D 46/12 264/239 |
| 2012/0251653 A1 | 10/2012 | Mathy, Jr. et al. | |
| 2012/0260870 A1 | 10/2012 | Wahl et al. | |
| 2013/0036860 A1 | 2/2013 | Corniani | |
| 2014/0001726 A1 | 1/2014 | Statz | |
| 2014/0033940 A1 | 2/2014 | Simpson et al. | |
| 2014/0150601 A1 | 6/2014 | McGrath | |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |

(56) References Cited

FOREIGN PATENT DOCUMENTS

| | | |
|---|---|---|
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| EP | 1935226 | 6/2008 |
| WO | 2012/166629 | 12/2012 |

\* cited by examiner

HARVESTING HEADER BAT WITH ADJUSTABLY SPACED QUICK RELEASE FINGERS

CROSS-REFERENCE TO RELATED APPLICATIONS

This application is a continuation of U.S. patent application Ser. No. 14/486,863 filed on Sep. 15, 2014, which is a continuation of U.S. patent application Ser. No. 13/766,883 filed on Feb. 14, 2013, now U.S. Pat. No. 8,833,048 issued on Sep. 16, 2014. This application also claims the foreign priority benefit of corresponding Canadian Patent Application Serial No. 2,803,715 filed on Jan. 28, 2013. The entire contents of the aforementioned applications are incorporated by reference herein.

FIELD OF THE INVENTION

The invention relates to agricultural implements for harvesting crops, and more particularly to harvesting headers having bats with replaceable fingers.

BACKGROUND OF THE INVENTION

It is known in the field of crop harvesting equipment to employ harvesting headers to cut standing crops for various purposes, such as feeding a combine harvester or swathing crop material. Such harvesting headers commonly comprise a forwardly disposed cutter bar assembly for cutting the crop material, a draper deck or auger assembly rearward of the cutter bar assembly for transporting the cut crop material to a desired location (e.g. the intake for a combine harvester), and a generally cylindrical reel assembly parallel to the length of the cutter bar assembly for controlling the movement of cut crop against the cutter bar assembly and onto the draper deck assembly or into an auger assembly. The reel comprises a central rotatable shaft and a plurality of bats at a set distance from the central shaft, spaced apart from each other, each of the bats containing fingers or other members for engaging and guiding the crop material. The fingers may be composed of any suitable material given the particular crop and application, such as steel or molded plastic. In operation, the implement is driven into the standing crop, with the cutter bar assembly and reel assembly at the leading edge of the implement. After the cutter bar assembly cuts the crop material, the crop material falls and/or is moved rearwardly with the assistance of the reel assembly onto the generally horizontal draper deck assembly or horizontal auger assembly and then transported perpendicular to the direction of travel by the draper deck assembly or auger assembly and deposited either on the ground or at an intake for subsequent processing. Such an arrangement has many known benefits and has achieved wide acceptance and use.

However, a long-standing problem with conventional reel assemblies is that the fingers are commonly thin and provided with little structural support and accordingly are subject to significant wear and even breakage. It is costly and time-consuming to repair such damage in a conventional arrangement, particularly where fingers are welded or otherwise attached to the bat in a like manner.

There have been some attempts in the past to address this problem. For example, it is known in the art to releasably mount the fingers on the bat, to enable a less expensive and time-consuming repair solution. Fingers have been designed to bolt onto a bat, for example, and this has gained some popularity among implement users. U.S. Pat. No. 6,324,823 teaches a finger that attaches to a mounting collar, which collar is in turn bolted to the bat, and the collar can be unbolted and the finger repaired or replaced.

Alternative prior art solutions include the use of molded plastic fingers that can releasably engage a bat. For example, U.S. Pat. No. 4,776,155 teaches a bat formed using sheet metal, the bat provided with spaced apart holes for receiving the mounting ends of fingers. The fingers themselves are molded plastic and provided with a button at the base to mate with a hole in the bat.

While various solutions have been proposed, there still remains a desire in the technical field for a bat-finger arrangement that is simple, reliable and easy to repair. Also, the prior art solutions fail to address another noted problem in the field, namely the need for different finger spacings for different crops or applications. For example, prior art bats are provided with holes for receiving bolts or finger buttons, with the obvious result of set spacings. What is required, therefore, is a bat that provides for both simple finger repair or replacement and varied finger spacings.

SUMMARY OF THE INVENTION

An embodiment of the present invention seeks to provide a bat that incorporates a channel to removably receive alternating quick-release fingers and spacers, the spacers being capable of production in different lengths to support different applications of the harvesting header.

According to an illustrative embodiment of the present invention there is provided a bat for a harvesting header, the bat comprising an elongate channel extending substantially the length of the bat and configured to removably receive alternating crop-engaging fingers and spacers. The channel comprises spaced apart flanges extending toward each other across the channel. Each of the fingers is provided with projections configured for slip-fit mating with each of the flanges, such that the finger can be inserted between the flanges and into the channel in a first orientation and subsequently rotated into a second orientation to mate the projections and the flanges and thereby releasably lock the finger in the channel. Each of the spacers is also configured to engage the flanges of the channel and may be provided in different lengths to adjust the spacing between the fingers on the bat.

According to an illustrative embodiment of the present invention there is a provided a harvesting header comprising a frame and a reel assembly mounted on the frame, the reel assembly comprising a plurality of bats disposed about a central shaft, each of the plurality of bats comprising an elongate channel extending substantially the length of the bat and configured to removably receive alternating crop-engaging fingers and spacers. The channel comprises spaced apart flanges extending toward each other across the channel. Each of the fingers is provided with projections configured for slip-fit mating with each of the flanges, such that the finger can be inserted between the flanges and into the channel in a first orientation and subsequently rotated into a second orientation to mate the projections and the flanges and thereby releasably lock the finger in the channel. Each of the spacers is also configured to engage the flanges of the channel and may be provided in different lengths to adjust the spacing between the fingers on the bat.

In exemplary embodiments of the present invention, the finger is composed of a molded plastic of sufficient strength to be rotated into and out of the locking orientation without breaking. The bat comprises an elongate tube which is preferably composed of extruded aluminum.

A detailed description of an exemplary embodiment of the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention:

FIG. 2b is a rear elevation view of the quick release finger of FIG. 2a;

FIG. 3b is a side elevation view of the spacer of FIG. 3a;

FIG. 4b is a top plan view of the bat tube of FIG. 4a;

An exemplary embodiment of the present invention will now be described with reference to the accompanying drawings.

DETAILED DESCRIPTION OF EXEMPLARY EMBODIMENT

An embodiment of the present invention relates to a novel reel bat and associated fingers and spacers, and a header incorporating such a novel reel bat. Only those parts of the header as are necessary for description of the reel bat are discussed herein, and the remaining parts and functions of the header will not be discussed as they are conventional and well known to those skilled in the art.

Figure 1:
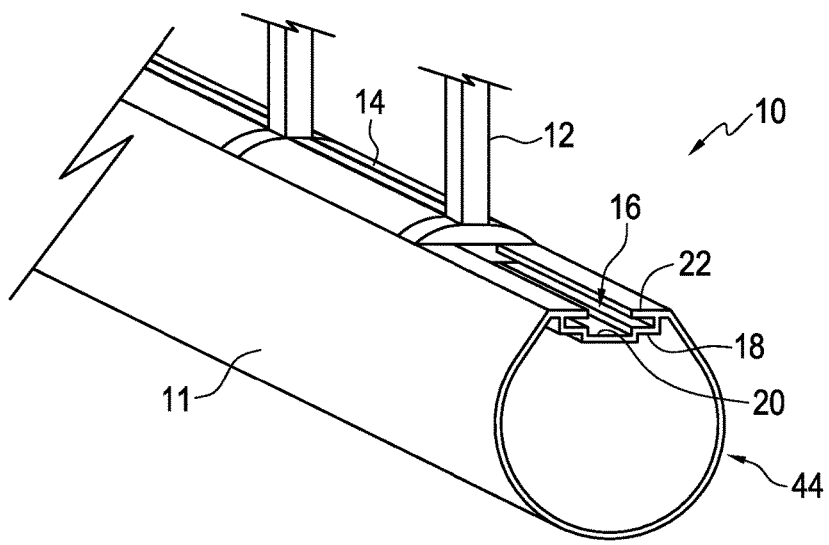
FIG. 1 is a perspective view of a header bat according to an embodiment of the present invention.

Turning to FIG. 1, a partial reel bat 10 is shown. The bat 10 comprises a tube 11 incorporating a channel 16, a plurality of fingers 12, and a plurality of spacers 14 alternating with the fingers 12. Only a portion of the bat 10 is illustrated, as the pattern of alternating fingers 12 and spacers 14 would preferably continue the length of the tube 11. The tube comprises a connector 18 and a slot 20 therein. The channel 16 is defined by the tube 11 walls and the connector 18, and it is open at an upper end. The upper opening of the channel 16 is bordered by flanges 22 which run the length of the channel 16 and extend toward each other but leave a gap therebetween. The open end 44 of the bat 10 would be mounted to a bat support arm (not shown) of a reel assembly (not shown) in a conventional manner well known to those skilled in the art. As would be obvious to those skilled in the art, each paired finger/spacer could be manufactured in a unitary design for insertion into the open end 44, but the exemplary embodiment will discuss them as separate elements with the fingers 12 rotatable within the channel 16 between insertion and locking orientations. The manner in which the fingers 12 and spacers 14 are locked into the channel 16 is discussed below.

Figure 2A:
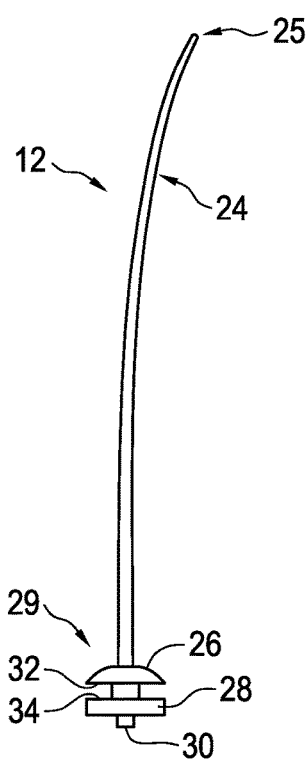
FIG. 2a is a side elevation view of a quick release finger according to an embodiment of the present invention.
Figure 2B:
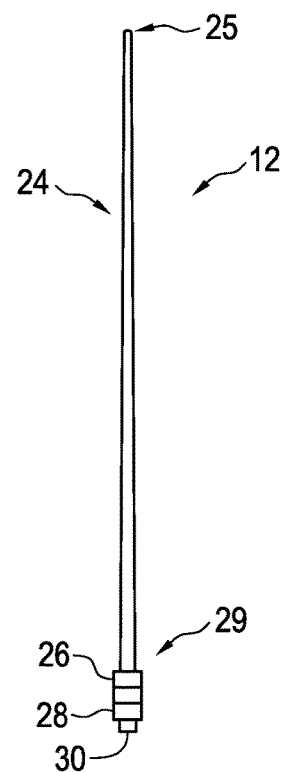

FIGS. 2a and 2b illustrate a finger 12 according to an embodiment of the present invention. The finger 12 comprises a curved portion 24 ending in a distal tip 25 and a connecting portion 29 at the opposite end of the finger 12. The connecting portion 29 comprises spaced apart upper and lower members 26, 28, with the gap between the upper and lower members 26, 28 defined by a lower surface 32 of the upper member 26 and an upper surface 34 of the lower member 28 and configured to accept the flanges 22 therebetween in a manner discussed below. The finger 12 also comprises a base 30 that is configured for retention in the slot 20 of the connector 18. The finger 12 is preferably composed of a molded plastic material of sufficient strength for the specific application and to be twisted into and out of locking orientation as discussed below.

Figure 3A:
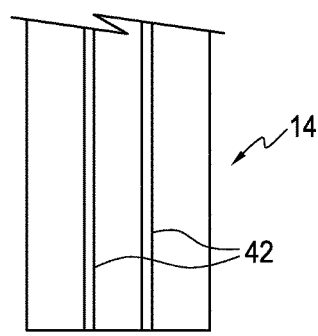
FIG. 3a is a top plan view of a spacer according to an embodiment of the present invention.
Figure 3B:
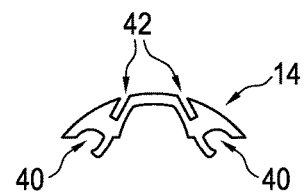

FIGS. 3a and 3b illustrate a spacer 14 according to an embodiment of the present invention. Like the finger 12, the spacer 14 is preferably composed of a molded plastic material. The spacer 14 is provided with grooves 40 at the edges for removably attaching to the flanges 22 of the tube 11, as can best be seen in FIGS. 3b and 6. The spacer 14 is also provided with notches 42 to assist in flexibility when attaching or detaching the spacer 14 from the flanges 22.

Figure 4A:
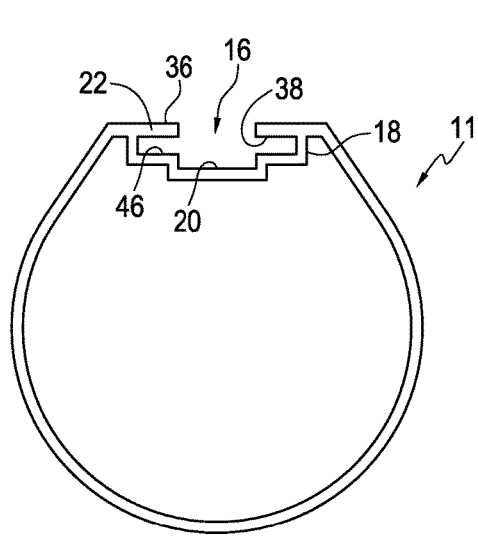
FIG. 4a is a side elevation view of a bat tube according to an embodiment of the present invention.
Figure 4B:
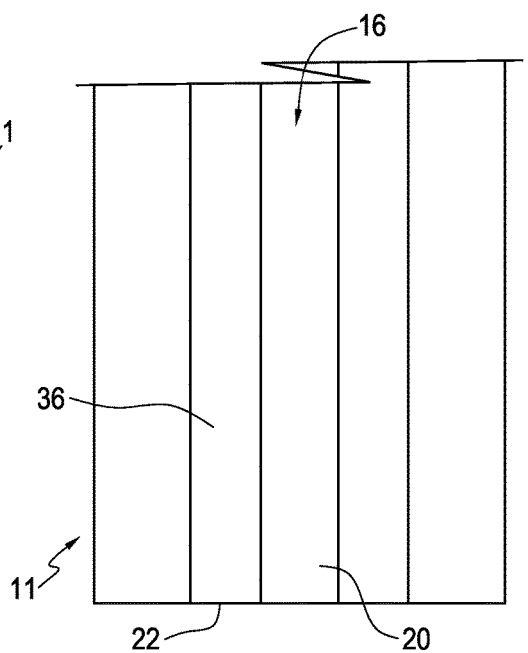

FIGS. 4a and 4b illustrate a tube 11 according to an embodiment of the present invention, and is shown in perspective view in FIG. 1. The tube 11 is preferably composed of extruded aluminum, but may be of any alternative suitable material known to those skilled in the art. The tube 11 comprises a connector 18 and spaced apart flanges 22, which collectively define a channel 16. The flanges 22 each comprise an upper surface 36. The connector 18 incorporates a slot 20, and the channel 16 is further defined by upper and lower surfaces 38, 46.

Figure 5A:
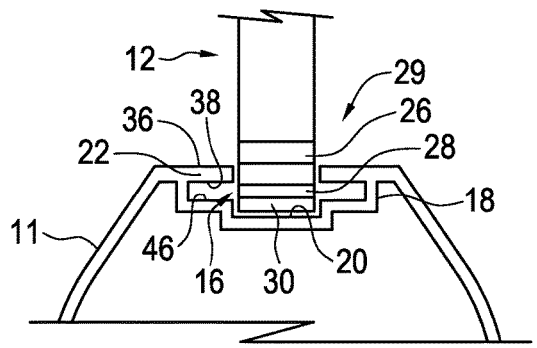
FIG. 5a is a side elevation view of a finger being positioned into the channel of the bat tube.
Figure 5B:
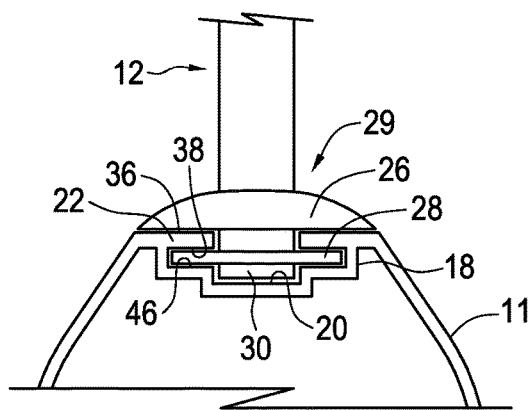
FIG. 5b is a side elevation view with the finger of FIG. 5a rotated to lock into place in the channel.
Figure 6:
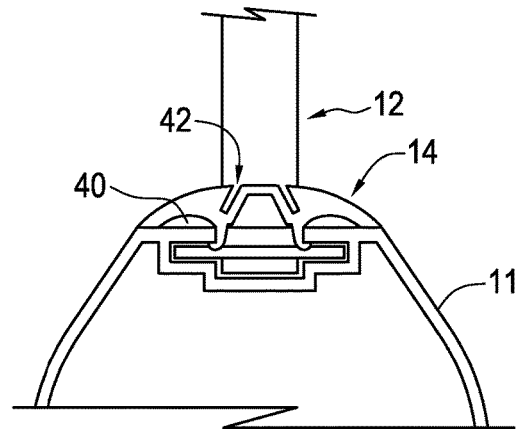
FIG. 6 is a side elevation view of a spacer in position in the channel of the bat tube.

Turning now to FIGS. 5a, 5b and 6, the attachment of a finger 12 and spacer 14 to a tube 11 is illustrated. To insert the finger 12 in the tube 11, the finger 12 is held in a first orientation as shown in FIG. 2b, with the protruding edges of the upper and lower members 26, 28 parallel to the long axis of the channel 16. The finger 12 is then lowered into the channel 16 until the base 30 is received in the slot 20. This is shown in FIG. 5a. Once the base 30 has been thus received, the finger 12 is then rotated 90 degrees to a second orientation, as shown in FIG. 5b, such that the lower member 28 rotates into the gap under the flanges 22 between the lower and upper surfaces 38, 46. The lower member 28 is thus held firmly between the lower and upper surfaces 38, 46, and the upper member 26 rests on the upper surface 36 of the flanges 22. Once rotated into the second orientation, the finger 12 is thus locked into the channel 16.

Once the finger 12 has been locked into the channel 16, a spacer 14 can be inserted into the channel 16, as is shown in FIG. 6. Referring to FIGS. 3b and 6, the spacer 14 is provided with grooves 40 that are configured to engage the inner edges of the flanges 22. The spacer 14 is provided with notches 42 to provide flexibility that may aid in the insertion of the spacer 14. The spacer 14 can either be inserted from above the channel 16 or from the open end 44 of the tube 11 and slid into position against the finger 12. The spacer 14 can be manufactured at any desired length, depending on the optimal or desired finger 12 spacing for the particular implement or application. Once the spacer 14 is in position against the finger 12, another finger can be inserted, followed by another spacer, and continuing until the channel 16 of the tube 11 has been filled.

In some embodiments, if a finger becomes worn or otherwise damaged, the tube can be easily removed from implement, fingers and spacers can be removed from the channel to arrive at the target finger, and the target finger can be easily and quickly removed and replaced.

As can be readily seen, then, there may be numerous advantages provided by embodiments of the present invention. As mentioned above, in some embodiments it may be simple and quick to replace worn or broken fingers. In some embodiments, the tube, fingers and spacers can be composed of any material suitable to the particular application. Also, in some embodiments the spacers can be of any length and therefore provide for adjustability, such that fingers can be positioned at any desired spacing.

The foregoing is considered as illustrative only of the principles of the invention. Thus, while certain aspects and embodiments of the invention have been described, these have been presented by way of example only and are not intended to limit the scope of the invention. The scope of the claims should not be limited by the exemplary embodiments set forth in the foregoing, but should be given the broadest interpretation consistent with the specification as a whole.

The invention claimed is:

1. A harvesting header comprising a frame and a reel assembly mounted on the frame, the reel assembly comprising one or more bat assemblies, each of the one or more bat assemblies comprising:
   a bat comprising a tube, said tube defining a longitudinally extending channel having a longitudinally extending continuous opening; and
   a plurality of fingers, each of the plurality of fingers comprising a finger connector operable to be separately inserted in the channel and separately rotated relative to the tube to cause the finger connector to be rotated from a releasable position where said finger connector is not retained in said channel to a retained position where said finger connector is retained in the channel,
   wherein the tube is operable to separately receive each of the plurality of finger connectors at a plurality of locations along the channel.

2. The harvesting header of claim 1 wherein the plurality of locations comprise a continuum of locations along the channel operable to receive the finger connectors.

3. The harvesting header of claim 1 wherein each of the finger connectors is operable to be rotated about 90 degrees relative to the tube to cause the finger connector to be retained in the channel.

4. The harvesting header of claim 1 wherein the tube comprises at least one flange defining an opening of the channel, said opening having an opening width and wherein tube comprises at least one interior wall defining an interior of the channel, said interior having an interior width that is greater than said opening width.

5. The harvesting header of claim 4 wherein each of the finger connectors includes at least one connector member having a connector member width less than the opening width and a connector member length greater than the opening width and wherein each of the connector members is operable to be received in the channel through the opening when in a first orientation relative to the tube, with the connector member width generally aligned with the opening width, and rotated in the interior of the channel to a second orientation, with the connector member length generally aligned with the interior width, to cause the connector member to overlap with the at least one flange and be retained in the channel.

6. The harvesting header of claim 5 wherein the tube defines a sub-channel within the channel and wherein each of the finger connectors includes a base member shaped complementary to the sub-channel and operable to be received in the sub-channel when the at least one connector member of the finger connector is received in the channel.

7. The harvesting header of claim 1 wherein the plurality of fingers are operable to be retained in spaced apart relation in the channel.

8. The harvesting header of claim 7 further comprising one or more spacers operable to be received in the channel between ones of the plurality of fingers.

9. The harvesting header of claim 8 wherein the one or more spacers comprise a plurality of spacers and each of the one or more spacers has a common selected length.

10. The harvesting header of claim 1 wherein the tube is unperforated.

11. The harvesting header of claim 1 wherein the tube is operable to receive the finger connectors at any point along the channel.

12. A harvesting machine comprising the harvesting header of claim 1.

13. A harvesting header comprising a frame and a reel assembly mounted on the frame, the reel assembly comprising one or more bat assemblies, each of the one or more bat assemblies comprising:
   a bat comprising a tube having at least one tubular wall, said tube defining a longitudinally extending channel; and
   a plurality of fingers, each of the plurality of fingers comprising a finger connector operable to be received in the channel and rotated relative to the tube to cause the finger connector to engage with the wall to be retained in the channel,
   wherein the tube is operable to receive each of the plurality of finger connectors at a plurality of locations along the channel;
   wherein the bat comprises at least one flange defining an opening of the channel, said opening having an opening width and wherein the bat comprises at least one interior wall defining an interior of the channel, said interior having an interior width that is greater than said opening width;
   wherein each of the finger connectors define at least one gap therein, said at least one gap operable to receive the at least one flange when the finger connector is rotated relative to the tube.

14. A harvesting header comprising a frame and a reel assembly mounted on the frame, the reel assembly comprising one or more bat assemblies, each of the one or more bat assemblies comprising:
   a bat comprising a tube having at least one tubular wall, said tube defining a longitudinally extending channel; and
   a plurality of fingers, each of the plurality of fingers comprising a finger connector operable to be received in the channel and rotated relative to the tube to cause the finger connector to engage with the wall to be retained in the channel,
   wherein the tube is operable to receive each of the plurality of finger connectors at a plurality of locations along the channel;
   one or more spacers operable to be received in the channel between ones of the plurality of fingers;
   wherein the tube comprises at least one spacer engaging flange extending partially across the channel and wherein each of the one or more spacers comprises at least one groove for receiving the at least one spacer engaging flange.

15. A bat assembly for a harvesting header, the bat assembly comprising:
   a bat having a wall structure defining a longitudinally extending channel; and
   a plurality of fingers, each of the plurality of fingers comprising a finger connector operable to be separately inserted in the channel and separately rotated relative to the bat holder to cause the finger connector to be retained in the channel,
wherein the is operable to separately receive each of the finger connectors at a plurality of locations along the channel.

16. The bat assembly of claim 15 wherein the plurality of locations comprise a continuum of locations along the channel operable to receive the finger connectors.

17. The bat assembly of claim 15 wherein the bat comprises at least one flange defining an opening of the channel, said opening having an opening width and wherein the bat comprises at least one interior wall defining an interior of the channel, said interior having an interior width that is greater than said opening width.

18. The bat assembly of claim 17 wherein each of the finger connectors define at least one gap therein, said at least one gap operable to receive the at least one flange when the finger connector is rotated relative to the bat holder.

19. The bat assembly of claim 15 wherein the bat holder is unperforated.

20. The bat assembly of claim 15 wherein the bat holder is operable to receive the finger connectors at any point along the channel.

21. A method of retaining a plurality of fingers in a bat assembly for a harvesting header, the method comprising:
   separately inserting a finger connector of each of the plurality of fingers at one of a plurality of locations in a channel defined by a bat, each of said plurality of locations being operable to separately receive the finger connector of each of the one or more fingers; and
   separately rotating the finger connector of each of the plurality of fingers relative to the bat holder to cause the finger connector to be retained in the channel.

22. The method of claim 21 wherein receiving the finger connector of each of the plurality of fingers at one of the plurality of locations in the channel comprises receiving the finger connector at one of a continuum of locations along the channel, each of the continuum of locations operable to receive the finger connector of each of the plurality of fingers.

23. The method of claim 21 wherein receiving the finger connector of each of the plurality of fingers in the channel comprises receiving the finger connector through an opening of the channel defined by at least one flange of the bat, said opening having an opening width, and into an interior of the channel defined by at least one interior wall of the bat, said interior having an interior width that is greater than said opening width.

24. The method of claim 23 wherein rotating the finger connector of each of the plurality of fingers comprises receiving the at least one flange in at least one gap defined by the finger connector.

25. The method of claim 21 wherein the bat is unperforated.

26. The method of claim 21 wherein receiving the finger connector comprises receiving the finger connector at any point along the channel.

27. A bat assembly for a harvesting header, the bat assembly comprising:
   a bat having an elongated wall defining a channel having a longitudinally extending narrowed opening; and
   a plurality of fingers, each of the plurality fingers comprising a finger connector integral with the finger and operable to be separately inserted through said longitudinally extending narrowed opening into the channel and separately rotated relative to the bat to cause the finger connector to engage a recess in the channel and be retained in the channel, said recess extending along a length of the channel.

* * * * *